United States Patent [19]

Sitrick

[11] Patent Number: 4,572,509
[45] Date of Patent: Feb. 25, 1986

[54] VIDEO GAME NETWORK

[76] Inventor: David H. Sitrick, 820 Burchell Ave., Highland Park, Ill. 60035

[21] Appl. No.: 431,154

[22] Filed: Sep. 30, 1982

[51] Int. Cl.⁴ ............................................. A63F 9/22
[52] U.S. Cl. ................................ 273/85 G; 273/1 E; 273/DIG. 28
[58] Field of Search ............ 273/DIG. 28, 85 G, 1 E

[56] References Cited

U.S. PATENT DOCUMENTS

| | | | |
|---|---|---|---|
| 4,121,283 | 10/1978 | Walker | 273/DIG. 28 |
| 4,126,851 | 11/1978 | Okor | 273/DIG. 28 |
| 4,193,598 | 3/1980 | Freese | 273/DIG. 28 |
| 4,247,106 | 1/1981 | Jeffers et al. | 273/DIG. 28 |
| 4,389,048 | 6/1983 | Burgess | 273/DIG. 28 |

FOREIGN PATENT DOCUMENTS

2724153  8/1978  Fed. Rep. of Germany ... 273/DIG. 28

*Primary Examiner*—Richard C. Pinkham
*Assistant Examiner*—Leo P. Picard

[57] ABSTRACT

A system of distributed video game apparatus are capable of exhibiting an interactive single identity game. In one embodiment there is provided a distributed game system comprising a plurality of video game apparatus, selectively interlinkable to form a homogenous single identity game or as a peer game in the single identity system. The function of each video game apparatus can be defined at the start of game play. Each video game apparatus has a user input device, and can have its own video display, or a master video display can be provided for the whole system. As a single identity game system, each display, or the master display, can display the composite display resulting from the totality of peer game interaction. Alternatively, the display can provide individual peer game information. Individual peer game information can be communicated either globally or individually to and from selected one of the peer games. The system can provide for generating global and individual peer game displays to the selected display device. A communications manager can provide for interaction of remotely located individual game apparatus.

47 Claims, 13 Drawing Figures

VIDEO GAME NETWORK

This invention relates to video games and more particularly to a distributed system of video games.

Heretofore, video games have utilized a single entity concept, that each game be self-contained and housed in its own cabinet. Multiple player games have utilized the single entity concept, but have provided for either multiple player input apparatus housed in the cabinet, or single player input apparatus, where players take alternating turns. Multiple user interaction is usually nonexistent, and if present is very simplistic, and confined to the single entity concept.

It is therefore an object of the present invention to provide a system of distributed video game apparatus which are capable of exhibiting an interactive single identity game.

In accordance with one aspect of the present invention there is provided a distributed game system comprising a plurality of video game apparatus, selectively interlinkable to form a homogeneous single identity game system. In one embodiment each of the video game apparatus can function either as a stand alone single entity game or as a peer game in the single identity system. The function of each video game apparatus can then be defined at the start of game play. Alternatively, each of the video game apparatus can be limited in function to a peer game in the system.

Each video game apparatus has a user input device. Each video game apparatus can have its own video display, or a master video display can be provided for the system.

As a single identity game system, each display, or the master display, is capable of displaying the composite display resulting from the totality of peer game interaction. In an alternate embodiment, the display is also capable of displaying individual peer game information. Means are provided for intercommunicating individual peer game information, either globally or individually to selected one(s) of the peer games. Means are provided for generating global and individual peer game displays to the selected display device(s).

In accordance with another aspect of the present invention, each user is identified by a distinguishable representation. For example, color, size or shape can be used to distinguish users. In one embodiment a digitized image of each user's face is used as the distinguishable representation.

These and other aspects of the present invention can be better understood by reference to the detailed description of the accompanying drawings, wherein:

There are many complex subject areas cooperatively intertwined in the present invention, and discussed in the description herein.

Ample textual material documents each of these subject areas. Therefore, in the interest of conciseness and to aid in more clearly understanding the present invention, the following references are disclosed and incorporated herein by reference.

A good treatment of distributed computing networks in general can be found in *Computer Networks and Their Protocols,* D. W. Davies, D. L. A. Barber, W. L. Price, C. M. Solomonides, Publ. John Wiley & Sons, Copyright 1979, Reprint 1980; and

*Tutorial—MICROCOMPUTER NETWORKS,* Harvey A. Freeman and Kenneth J. Thurber, Publ. IEEE Computer Society Press, (Catalog No. 395), Copyright 1981; and

*COMPUTER NETWORKS: A Tutorial, Revised and Updated* 1980, Marshall Abrahms et al., Publ. IEEE Computer Society (N.Y.), (Catalog No. 297), Copyright 1980.

A good treatment of distributed computer systems in general can be found in *Aspects of Distributed Computer Systems,* Harold Lorin, Publ. John Wiley & Sons, Copyright 1980; and

*Tutorial: Distributed Processor Communication Architecture,* Kenneth J. Thurber, Publ. IEEE Computer Society (N.Y.), (Catalog No. #HO 152-159), Copyright 1979.

Numerous other areas of electronic video game design can be found in the literature and books. For example, see:

*Electronic Pinball Electronics* Volumes 1 and 2 R. A. Hornick, Publ. Laserscope Ltd., Copyright 1979; and

*Electronic Games, Design Programming and Troubleshooting,* Walter H. Buschsbaum and Robert Mauro, Publ. McGraw-Hill Book Company; and

*How to Design & Build Your Own Custom TV Games,* David L. Heiserman, Publ. Tab Books, Copyright 1978.

Various electronic and electromechanical embodiments of video games can be seen in arcades across the world. Detailed information is available in the form of owner and repair manuals. Video game software listings can be found in the U.S. Copyright Office, TX Registration (literary works).

Figure 1A:
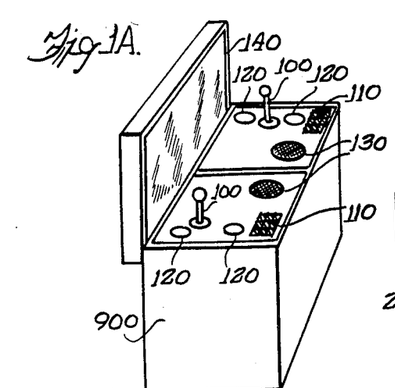
FIGS. 1A–1C illustrate various embodiments of user consoles in accordance with the present invention.
Figure 1B:
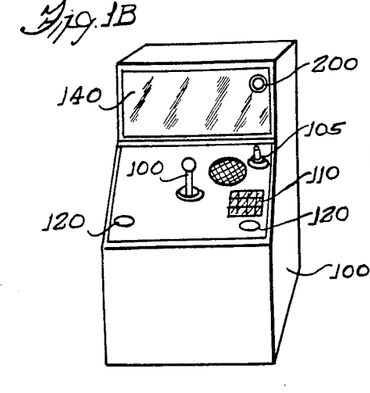
Figure 1C:
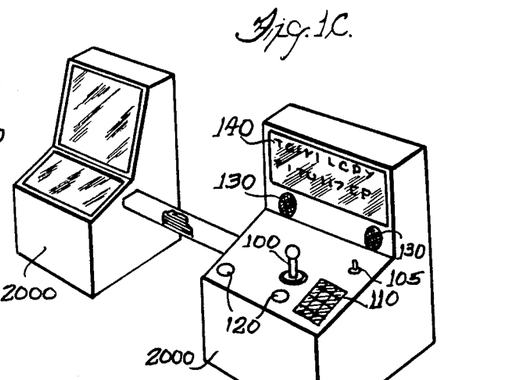

Referring to FIGS. 1A–1C, various embodiments of user interface consoles are illustrated. Referring to FIG. 1A, a table model user console 900 is shown. The console 900 houses the necessary electronic and electromechanical apparatus to perform all necessary user console functions. In one embodiment these functions include the entire stand-alone game operation. In another embodiment, the user console functions simply as an input device for interface with the user. The user console can perform a number of functions ranging in between or in addition to those discussed above. For example, the user interface console can provide for communications between user consoles, and/or between a user console and a central master controller. As illustrated in FIG. 1A, the user console 900 has two user stations mounted thereon. Each user station consists of a joy stick 100, a communications switch 105, a keyboard 110, a push button or other user activated switch means 120, and a speaker/microphone 130. Some or all of these elements may be optional depending on the particular application. As illustrated, the communication switch 105 allows for bidirectional voice communication via the speaker/microphone 130 to other selected user stations and consoles. The keyboard 110 may be utilized for providing user coordinate data, communications identification data, and other user input data for communications to the game system electronics. As illustrated in FIG. 1A, the table model user console 900 also contains a display 140 mounted for viewing by both users when seated at the user station of the console 900.

Referring to FIG. 1B, an alternate embodiment of a user console 1000 is shown. The user console 1000 can perform as an arena console, that is a plurality of users can sit down, one or more at each console, with a plurality of consoles 1000 interconnected and with one or a plurality of master displays provided, as described more fully below with reference to FIGS. 2A-2D. The arena console 1000 has a user station mounted thereupon which contains equivalent I/O circuitry to that discussed with reference to FIG. 1A. Specifically, as illustrated, a joy stick 100, a communication switch 105, a speaker/microphone 130, a keyboard 110, and switches 120 are provided, in part or in total depending upon the application. The function that the individual input devices perform is again dependent upon the desired application. The arena console 1000 can be utilized as a stand-alone system with the addition of display 140 as shown in phantom in FIG. 1B. The console 1000 can be utilized as either a stand-up or sit-down console, in either a stand alone or multiuser game system.

Referring to FIG. 1C, a user console 2000 is illustrated showing a stand-up arcade console. As illustrated, the console 2000 can function as a stand-alone game system or may interconnect via communications means 2100 to other consoles 2000 to form an interactive network. The console 2000, as illustrated, is comprised of a display 140, which displays either single game action or multigame global action, depending upon the application. Similar I/O devices are provided as described above with reference to FIGS. 1A-1B. Specifically, as illustrated, the console 2000 contains speaker/microphones 130, a communications switch 105, a keyboard 110, a joy stick 100, and switches 120. As discussed above with reference to FIGS. 1A-1B, additional or lesser device apparatus can be provided, in accordance with the desired application.

Figure 2A:
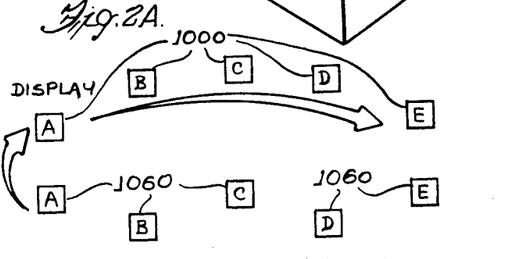
FIGS. 2A–2D illustrate various user station and display unit architectures and interconnect structures in accordance with the present invention.

Referring to FIG. 2A, a multiconsole multidisplay global game network is illustrated. A plurality of user consoles 1060 A-F are interconnected and configured as a multiuser game system. Each of the user consoles 1060 can be comprised of a user console as described with reference to FIGS. 1A-1C. In the illustrated embodiment, an arena console 1000 is utilized in the system of FIG. 2A. A plurality of displays 1100A-E are provided for providing graphical illustration of game play action. The display 1100 can be any sort of video display, and is preferably a color video cathode ray tube. The number of user consoles 1060 and the number of displays 1100 can vary up or down from the system illustrated in FIG. 2A, depending upon the application. The visuals associated with the global game action can be displayed piecemeal, that is, with each subdisplay units 1100A to 1100E displaying a portion of the total global display so that the totality of display units 1100A-E provides a total global display. Alternatively, one or more of the subdisplays can provide a display associated with a respective individual game apparatus. Alternatively, some of the subdisplays can provide game action imagery, while others of said subdisplays provide a radar function display for tracking of other user consoles responsive to an overall system controller or responsive to a particular user request. In a like manner, some of the displays can provide exploded views of selected quadrants of previously displayed imagery responsive to a system controller or to a particular user's input data request. As shown in FIG. 2A, the display apparatus 1100 is comprised of a plurality of subdisplays, each subdisplay having a separate and distinguishable viewing area. The plurality of subdisplays can provide in combination a coherent total display, or a plurality of interrelated displays. In one embodiment, where the global display is provided by the totality of subdisplays, a single user's video representation can be caused to move graphically from one subdisplay unit to another. The use of multiple subdisplays provides an added dimension of excitement and realism to the game play.

Figure 2B:
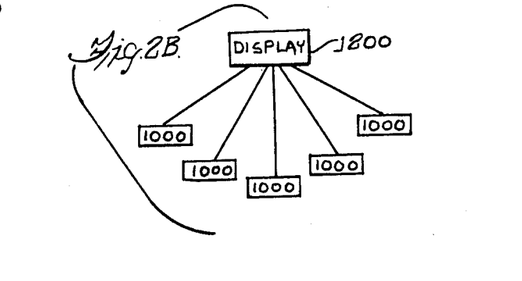

Referring to FIG. 2B, an alternate multiuser system is illustrated having a plurality of user consoles interconnected to a central display unit 1200. As illustrated in FIG. 2B, the user consoles 1000 all interconnect to a display apparatus 1200 which provides a single coherent display of the global game action, as well as selectively providing radar functional displays and exploded quadrant displays on portions of the display area. The user console 1000 can be of any user console type (900, 1000, 1100) as discussed above with reference to FIGS. 1A-1C. The display apparatus 1200 can include a controller apparatus for coordinating data received from the plurality of user stations interconnected thereto. Alternatively, each of the user consoles 1000 can contain control circuitry for coordinating global action, and the display apparatus 1200 can contain only a minimum of interface circuitry. Additionally, the display apparatus 1200 contains a video display for providing graphical illustrations of game actions.

Figure 2C:
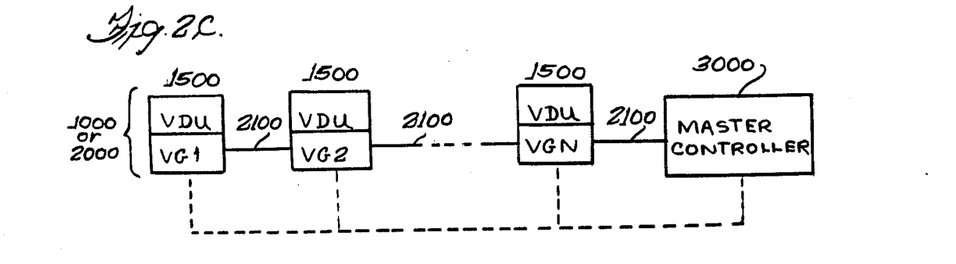

Referring to FIG. 2C, a multiuser game system is illustrated having a plurality of video game user stations such as user console 1000 or 2000, interconnected to each other and/or to a master controller 3000 by interconnection means 2100.

Figure 2D:
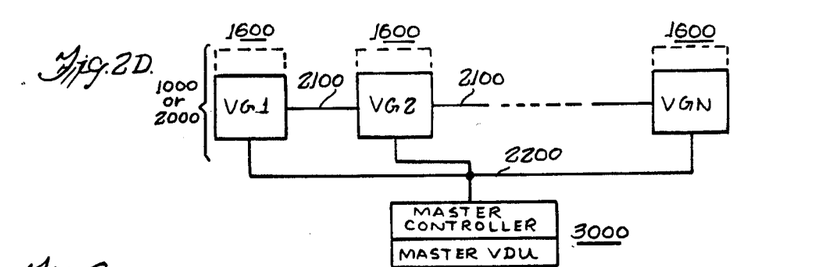

Referring to FIGS. 2C and 2D, different embodiments of a multigame apparatus system in accordance with the teachings of the present invention are shown. Referring to FIG. 2C, a game system is shown comprising a plurality of individual game apparatus, V.G.1 to V.G.N., having associated user responsive inputs as discussed with reference to FIGS. 1A-1C. Interconnection means 2100 provide for coupling together of selected ones of the game apparatus V.G.1 to V.G.N. and the master controller 3000. Alterntively, or additionally, the individual game apparatus V.G.1 to V.G.N. and master controller 3000 are interconnected via a coupling bus 2200. Other interconnect structures can also be used, such as ring, daisy-chain, etc. The visuals associated with selected ones of the game apparatus V.G.1 to V.G.N. are displayed on a display screen. As illustrated in FIG. 2C, each game apparatus has an associated video display unit, V.D.U., associated physically with the game apparatus. However, as discussed with reference to FIG. 2D, a single master controller can be provided and a single master video display associated therewith, or multiple video display units can be provided in an associated or a nonassociated manner, as discussed with reference to FIG. 2A. The master controller 3000 provides means for controlling the displayed visuals of selected game apparatus on the video display unit responsive to respective user responsive inputs of the selected game apparatus V.G.1 to V.G.N., and according to one of a plurality of predetermined logical sequences.

The master controller function can be separated into a single system master controller 3000, or can be partially distributed in function among the individual game apparatus. The choice is one based on design and cost restraints, and performance goals. The discussion herein regarding the master controller 3000 should therefore be interpreted in a functional rather than physical sense, with physical distribution of the function being left to the designer.

In the illustrated embodiment of FIG. 2C a master controller 3000 can additionally provide means for periodically transferring data for storage in the individual game apparatus V.G.1 to V.G.N., or selected individual ones of the game apparatus which are activated for play. Means of activation of this system include coins, tokens, or other control access means, such as on/off switches, etc. The master controller 3000 additionally comprises a memory for providing a data output, and means for sequencing through one of a plurality of predetermined audiovisual works responsive to the data output and the plurality of user control signals from the user game apparatus inputs of V.G.1 to V.G.N. The master controller can provide unique user activated selection of audiovisual imagery responsive to the users selected control signals. For example, means can be provided for displaying a radar function for tracking other selected users movements and actions, or alternatively for providing an exploded view of a selected quadrant or subquadrant of previously or presently displayed imagery.

Referring to FIG. 2D, an alternate embodiment of a game system having multiple game apparatus V.G.1 to V.G.N. and a master controller 3000 is shown, wherein the master controller 3000 has a master video display V.D.U. associated physically therewith. The master controller functions are those as discussed above with reference to FIG. 2C. The master controller 3000 is interconnected to the game apparatus V.G.1 to V.G.N. via interconnection bus 2200, and can alternatively, or additionally, be connected to the game apparatus V.G.1 to V.G.N. via interconnection bus 2100. With reference to FIGS. 2A-2D, it should be understood that various combinations of user input circuitry, game apparatus, interconnection structures, and video display physical and logical placement can be structured according to the needs of the application.

A great deal of flexibility exists in choosing between hardware and software boundaries for functions to be performed in the game system. It should be understood that distribution of system functions is a multidimensional concept as discussed herein. Thus, not only can there be physcial distribution of apparatus, but also distribution of function implementation between hardware and software embodiments. Various examples of the multidimensional aspect of distribution are provided in the various figures herein.

Figures 3, 5:
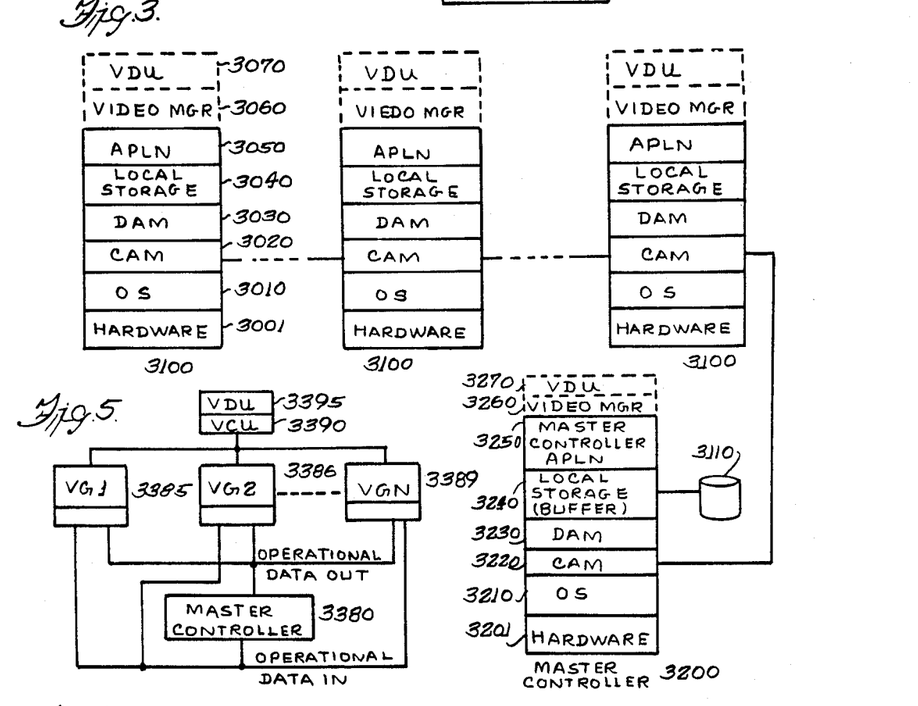
FIG. 3 illustrates a detailed structural diagram of the hardware/software functional architecture of a distributed game system in accordance with the present invention such as can be utilized with the systems of FIGS. 2A–2D.
FIG. 5 is a block diagram illustrating a distributed game system having a master controller, a plurality of video game user consoles, and a video control and display unit, in accordance with one aspect of the present invention.

Referring to FIG. 3, a video game system is illustrated comprising a plurality of user consoles V.G.1 to V.G.N., a display apparatus, or a plurality of display apparatus (V.D.U.'s), a memory, and logical sequencing means. The user consoles are as described above with reference to FIGS. 1A-1C, and can provide at least one user control for providing signals responsive to activation by the user of the user control. The display apparatus, V.D.U., are as described above with reference to FIGS. 2A-2D, and provide means for producing game imagery representative of at least some of the user control signals and responsive to the logical sequencing means. As shown in FIG. 3, the logical sequencing means is distributed between the master controller and the game apparatus user consoles V.G.1 to V.G.N. The amount of centralized or distributed allocation of this function is again a design variable. The logical sequencing means sequences through one of a plurality of audiovisual works responsive to the data output of the memory and to the plurality of user control signals, thereby producing game action on the display apparatus according to a predetermined set of game rules as stored in the memory. As discussed above with reference to FIGS. 2C and 2D, the master controller and/or distributed logic sequencing means can provide one of the plurality of display functions responsive to user activation of a respective function control within the game consoles V.G.1 to V.G.N. Thus, audiovisual imagery providing a radar function, exploded quadrant views, and so forth can be provided.

FIG. 3 also illustrates the functional layering of the individual user console apparatus V.G.1 to V.G.N. and of the master controller. Each layer is directly related to adjacent layers and can provide for communication between those layers. Communication to nonadjacent layers is via adjacent layers.

The different layers of the individual player consoles and master controller console can be further sublayered or can be alternately combined to reduce the total number of layers. The following functional description of each of the layers is general, applicable to both the individual console units 3100 and the master controller 3200. The bottom layer of each unit (3001 [3201]) comprises the central processing unit, memory, and various support logic circuitry. Nonvolatile memory and/or magnetic storage medium may also be provided at this layer. The operating system (3010 or 3210) functionally maps the hardware to function translation, and provides an executive program, and monitor program, for overall coordination of the unit (3100 or 3200). The communications management layer (3020, 3220) performs information format translation, packing and unpacking of data, error correction and checking, and other utility functions necessary to support communications. As illustrated, the communications management unit communicates with the operating system and data management layers adjacent to it, as well as communicating with the communications management units of other consoles. The data management layer (3030 or 3230) performs the functions of file management, data base management, disk access and decode management, and can alternatively or additionally perform other disk access and data management functions. A local storage area (3040 and 3240) provides a data buffer for temporarily storing data for communications to adjacent layers, and in the case of the master controller 3200 for communications to the disk 3110. The next layer is an applications program layer (3060 in the individual consoles, and 3260 in the master controller 3200) which performs the function of game logic definition, data input and output manipulation and translation, and video output generation. In the master controller 3200, the applications layer 3520 further includes the functions of disk allocation, and interuser coordination, and may include other global and special functions. The video management layer (3060, 3260) functions as a display composer. For example, video management layer 3260 of the master controller 3200 can act as a display composer performing global and special functions while leaving local display composing functions to the local video management layers 3060 of the consoles 3100. Alternatively, special and global functions may be dispersed among the video management units of the various consoles 3100 as well as or instead of the master controller 3200. The output of the video management layer provides display output to the video display unit (3070, 3270), providing the game(s) audiovisual presentation. As described above herein, the video display unit function can be dispersed among a plurality of display units, or may be provided by a single master display unit.

Figures 4, 6A, 6B, 7:
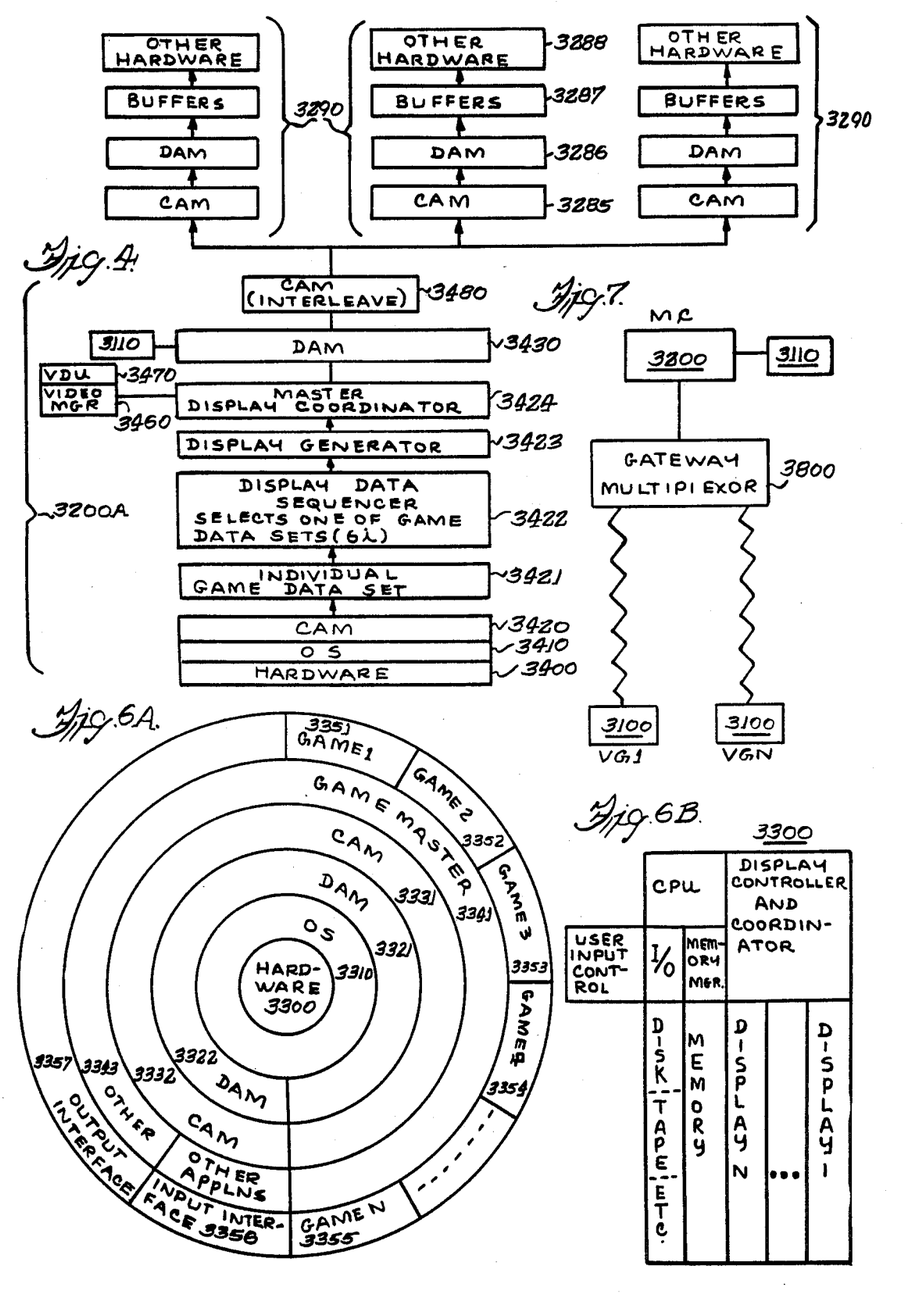
FIG. 4 is a detailed structural drawing illustrating the hardware/software architecture of an alternate embodiment of a system as in FIG. 3.
FIGS. 6A and 6B illustrate a structured layering of hardware and software elements such as utilized in the system of FIG. 5.
FIG. 7 illustrates a remote communication capability added to a system such as in FIG. 5, in accordance with the distributed nature of the system.

Referring to FIG. 4, an alternate embodiment of the system of FIG. 3 is shown, illustrating an interleaved communications controller embodiment. The master controller is comprised of hardware 3401, operating system 3410 and communications management layers CAM 3420, functionally corresponding to the correspondingly numbered elements of FIG. 3. The CAM communicates with the adjacent functional layer 3421 comprising the individual games data sets. This layer, 3421, can include all data relating to all games active within the master system, and may include other data sets. The data sets functional layer also communicates with the adjacent display data sequencer functional layer 3422, which selects one of N game data sets to be passed to the display generator 3423 of the adjacent functional layer. The display generator 3423 composes the selected data set into a corresponding audiovisual presentation for providing the game presentation. The game presentation output is coupled to the adjacent layer of the master display coordinator 3424 which controls what type of display (local, global, special [such as expanded]) is used as well as where to send the display data. In one embodiment the display data can be sent to the video manager 3460 for display on the video display unit 3470 of the master controller 3200A. Alternatively, the display generated data can be output from the master display controller 3424 to the adjacent management layer 3430 which can either pass data to the communications controller 3480 of the adjacent layer or store and retrieve data to and from the disk drive 3110. Data passed through the communications management layer 3480 is, in the illustrated embodiment of FIG. 4, selectively passed to one of the individual game consoles 3290. The communications controller 3480 is coupled via a bus or gateway to corresponding communications management controllers 3285 in each of the attached individual consoles 3290. Individual consoles 3290 can also include data management layers 3286, memory buffers 3287, and other hardware layers designated 3288. The other hardware can include a separate central processing unit, additional video display capability, and other logic. Thus, in operation, the output from the master controller 3200A is interleaved for local storage in buffers in each of the individual consoles. Thus, communications between the master controller 3200A and each of the individual consoles 3290 can be limited to changed data only, and either a single global game or a plurality of individual games can be coordinated via a single master controller 3200A. Communication can be bidirectional, such that each game can provide data back to the master controller 3200A, and such that each game can request special viewing, such as quadrant, exploded, global, local, etc. By utilizing multiple frame memories 3287 and associated other hardware 3288 in each of the individual consoles 3290, all viewing functions could be handled by each individual game console based on a single interleaved data set. This description of the interleaved embodiment is but one embodiment which the system can form. In another embodiment, each game individual console has its own computer and communications management controller. Each game individual console then periodically communicates signals representing, for example, game I.D., game type, game data, etc., representing changes to its I/O structure affecting game visuals, score, game play, etc. Each individual game console can communicate with all others, by any of the above described communications schemes, or other communications schemes. Thus, all games individual consoles simultaneously adapt to the changed data, and the need for a master controller can be functionally distributed back to each of the individual game consoles.

Referring to FIG. 5, a block diagram illustrating one embodiment of a distributed game system communications interconnect circuit is shown. A master controller 3380 is coupled to an operational Data In communications bus, and an operational Data Out communication bus. Each of the individual video game consoles 3385, etc., is likewise coupled to the operational Data In bus and has a separate coupling to the operational Data Out bus. Thus, the master controller and individual video game consoles communicate among each other by means of the common bus structure. Each of the individual video game consoles, 3385, 3386 and 3389 as illustrated in FIG. 5, is also coupled to a Video Data bus. The video data corresponding to the individual games play action is coupled via the Video Data bus to the video controller unit 3390 which transforms the video data to an audiovisual display presentation for viewing upon the video display unit 3395.

Referring to FIGS. 6A-B, a structured layering of the hardware and software elements, such as can be utilized in the system of FIG. 5, is shown. Referring now to FIG. 6A, the functional layering is depicted as a plurality of concentric circles. The innermost circle 3301 represents the core hardware, including the central processing unit, memory, and I/O logic. The next layer is the operating system 3310 which includes monitor, executive, basic input/output system, and can further include the basic disk operating system, and so forth. The next layer comprises the data management layer comprising two parts, 3321 and 3322. Each subpart communicates only with the adjacent layers directly. Thus, data management layer 3321 communicates with the communication layer 3331 which communicates with the game master logic layer 3341, which in turn communicates with each of the game applications layers 3351-3355. The data management layer 3322 communicates with a communications management layer 3332 which in turn communicates with applications control programs 3342 and other programs 3343, which each respectively communicate with user input interface 3356 and user output interface 3357.

Referring to FIG. 6B, a detailed structural and functional layering of one embodiment of the hardware 3300 is shown. The hardware 3300 is comprised of a central processing unit, memory manager, memory, storage means such as disk or tape, user control input/output interface, a display controller and coordinator, and can include from one to a plurality of display apparatus.

Referring to FIG. 7, a remote communications capability system, similar to that of FIG. 3, illustrating another aspect of the distributed nature of the present invention is shown. A master controller 3200 such as that in FIG. 3, having an associated disk drive 3110, is illustrated coupling to a gateway multiplexer 3800 which selectively couples the signal output from the master controller 3200 to each of the remote video game consoles 3100, V.G.1 to V.G.N., as illustrated in FIG. 7. Thus, the master controller can interact with and/or control a plurality of remotely located video game units in any of the manners described above, either by remote control, or via direct interface.

Figure 8:
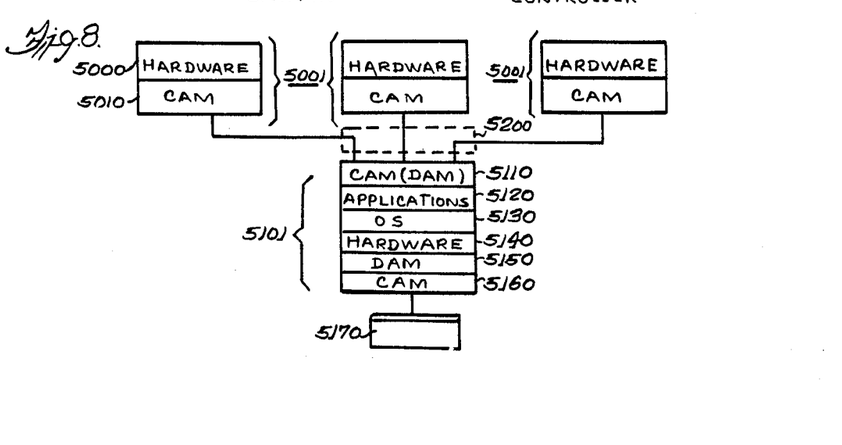
FIG. 8 illustrates the structure of the hardware/software layering as well as the distributed nature of the layering, for an alternate embodiment of the present invention.

Referring now to FIG. 8, still another embodiment of a distributed game system, as taught in the present invention, is shown, detailing the hardware/software layering as well as the distributed nature of the layering. The master controller 5101 is comprised of hardware 5140, including central processing unit, memory, and logic, which is coupled to a data management layer 5151, and therefrom to a communications layer 5160 which couples to the remote storage device 5170, such as a disk drive. The hardware 5140 is adjacent to the operating system 5130 on its other layer side. The layers 5130 to 5170 are similar to the functional descriptions for the equivalently named layers described above herein. The operating system layer 5130 communicates with the applications layer 5110, which can include a multiuser I/O coordinator, game logic control, display coordinator, display manager, special effects manager, and so forth. Lesser or greater functionality can be included at this layer. Additionally, the operating system 5130 can assist in the applications, in its performance of the hardware to functional allocation. The applications layer 5110 communicates with the communications/data management layer 5105 which provides for communications control between the master controller 5101 and each of the remote game units 5001. The individual games 5001 are comprised of a communications layer 5010 for communicating with the master controller 5101, either by direct coupling between the CAMS 5010 of each of the individual game units 5001 to the CAM/DAM 5105 of the master controller 5101, or via a gateway shown in dot-dash designated 5200 which acts to multiplex the individual outputs from each of the consoles 5001 for coupling to the communications layer 5105 of the master controller 5101. The communications controllers 5010 and 5105 provide for control of the transmit, receive, pack, unpack, error correction, file management, and data base management functions, and may include lesser or greater numbers of functions. Each CAM 5010 of the remote units 5001 is coupled to a hardware layer 5000, which can include the central processing unit, memory, control logic, and optionally a video display unit. Alternatively the video display unit can be included within the hardware of the master controller.

In operation, the operating system provides a master game executive/monitor. The master game executive/monitor provides numerous functions, including processing individual consoles inputs into identifying data packets, coordinating all individual game user actions into global equivalent action data, mapping global equivalent action into global mapping space, updating game action display according to one of a plurality of predetermined response sequences responsive to the data packets and mapping space, and outputting display information to individual displays or to the one master display. Additional conventional operating system features can also be integrated, as can special video game operating system features.

The communications manager for display and I/O can be utilized to transform display data from the master game executive monitor to compatible formats as associated with the hardware for displaying game action, and to transform each game's input and output to a format compatible with the master game executive monitor.

Operating system utilities can include a multitask coordinator/sequencer, boot strap program to initialize the system on power up, background/foreground system crash monitor, etc. The data manager utility can include the functions of open, delete, modify, swap, sort, etc. with reference to files in memory and stored on disk. It can also perform data base management and indexing functions, as well as file management and directory keeping functions. The communications manager can provide the functions of interfacing between individual games and the master controller, providing bidirectional communications of user control, I/D, and status signals, packing and unpacking data to and from transmission, etc.

This invention can find beneficial application in video arcades (either a single location or dispersed locations). Alternatively, the present invention can be utilized to provide or interactive game play as to allow an individual player apparatus console to remotely participate in a multiuser video game network. Thus, for example, a person with a modern input apparatus and an audiovisual cable link-up could tap into a centrally located game center data base.

Any practical means of communication can be utilized. For example, satellite (or microwave) communications linkage can provide the necessary broad bandwidth to allow totally digital communications to provide for the use of digital video transmission. More conventionally, analog video transmission (carrier modulated) communications can be utilized in conjunction with cable or air-wave broadcast medium to link the audiovisual presentation to the remote player. The remote player user apparatus can be linked via any practical medium to the master controller.

The hardware referred to herein can be readily constructed or purchased. Computers of all sizes (small, mini, maxi, main frame) and functionality are abundantly available. Performance to cost ratio is very high and hardware/software performance required for this invention is readily achievable. Alternatively or additionally the density of integration and computer aided design can allow total computer systems to be integrated on a single chip. Thus, for example, the master controller could comprise a microprocessor and support family or a microcomputer (CPU, I/O, Memory) integrated circuit such as the Intel 8086 or iAX432 families, the Zilog Z8000 family, Texas Instrument TMS 99XX families, etc. Additionally, communications integrated circuitry is at a comparable level.

In accordance with yet another aspect of the present invention, the video game can be made more personal and exciting by utilizing actual video imagery created responsive to user inputs at the individual game apparatus. This aspect of the invention can be utilized in either a stand-alone video game, or can be utilized in a multiuser game, either distributed or centrally controlled.

Referring agin to FIG. 1B, a video game console is shown which can either represent a stand-alone video game or can comprise an individual user apparatus for coupling to a multiuser game system as described elsewhere herein. The structure, electronically and logically, of the video game system can be as shown in FIG. 3 for the individual user apparatus, for the video game unit 3000. Referring now to FIGS. 1B and 3, a description of this aspect of the invention will be provided. The video game system has a video image input means, 200 of FIG. 1B, which provides the necessary hardware to input and digitize a visual image of the user of the individual game apparatus 1000. This mode may be selected either by the switch 105 or by input from the keyboard 110, and positioning of the video image input means 200 can be controlled via means of the joy stick 100 with the video image output being displayed on the display screen 140 to provide visual feedback to the user of the individual game apparatus of the image being digitized. When the desired image has beeen digitized and fed back for display to the user, the user can provide an input stimulus, either from the keyboard or via the switch 105, to cause the storage in the memory of the apparatus 1000 of the visual image of the user. Alternatively, the individual game apparatus 1000 can have the necessary visual recognition intelligence to automatically scan the video image input means across the user and select a video image for storage. Alternatively, the user can create images via the video input image means and/or the inputs of the keyboard 110, joy stick 100, and switch 105, which can then be selectively associated with one of a plurality of predetermined imagery identifier segments, to create an audiovisual display.

The user created visual display, either of the user or of the user created visual imagery, can then represent that user in the video game audiovisual presentation, either for the stand-alone game, or for a multiuser video game. Thus, the user can create his or her own spacecraft, race car, or other preselected character functions (e.g., subimage identifier segments) which can then be incorporated into the overall video game audiovisual presentation in combination with a predefined set of complimentary audiovisual imagery segments according to a predefined set of game rules.

The video image input means can be comprised of numerous imaging systems. Solid state (e.g., charge couple device video sensers) or video-tube based camera imaging systems, or other technology as applicable, can be utilized in accordance with this aspect of the present invention. Various lense and focusing arrangements can be utilized, including manually or electronically (automatically) controlled focusing and exposure systems, as well as zoom, etc. features can be provided for use in conjunction with the present invention.

While there have been described above various embodiments of distributed video game systems for the purpose of illustrating the manner in which the invention can be used to advantage, it will be appreciated that the invention is not limited to the disclosed embodiments. Accordingly, any modification, variation, or equivalent arrangement within the scope of the accompanying claims should be considered to be within the scope of the invention.

What is claimed is:

1. A video game network system comprising:
    a plurality of individual user apparatus, each said apparatus locally providing user input means for providing user signals, memory for storing game and display data, control means for logically sequencing through one of a plurality of predetermined audiovisual works responsive to said memory and said user signals, and display means for providing one of said plurality of audiovisual presentations to said control means;
    a master controller comprising means for coordinating a multi-user interactive video game including providing for local audiovisual presentations responsive to the plurality of user input apparatus, including means for communicating change data among the master controller and all selected ones of said user apparatus.

2. The system as in claim 1 wherein said master controller is further comprised of means for providing an output having an interleaved data structure for communicating said data to said selected plurality of individual user apparatus.

3. The system as in claim 1 wherein each said input apparatus memory contents is overwritten with data responsive to said change data.

4. The system as in claim 1 further characterized in that a single identity system game is simultaneously coordinated in said plurality of individual video game apparatus by said master controller.

5. The system as in claim 1 wherein each of said master controller and individual game apparatus is further comprised of:
    a central processing unit,
    a memory,
    control means for coordinating and assigning input and output of data for said master controller,
    data means for managing said data assignment to storage, retrieval, and transmittal coupled to said control means,
    communication means for selectively controlling communication of data input and output, coupled to said data means and to selected other ones of said other communications means.

6. The system as in claim 1 wherein said master controller is further comprised of:
    means for coordinating all individual user input apparatus user signals into a global equivalent video game audiovisual presentation having representative global responsive action to the user signals.

7. The system as in claim 6 further comprising:
    means for mapping user signals into a global memory wherein user signals representative of user actions are associated with equivalent global action data, and
    means for transferring appropriate respective change data to respective selected individual game apparatus responsive to said means for mapping.

8. The system as in claim 1 wherein each individual user apparatus can function independently as one of a stand-alone single entity game and as one of a plurality of peer games in a single identity game system.

9. The system as in claim 1 wherein the display of the audiovisual presentation provides a distinguishable representation associated with and for identifying each user from other users.

10. The system as in claim 1 wherein at least two of said individual user apparatus are further comprised of:
means for selectively providing voice communications with other selected individual user apparatus.

11. The system as in claim 1 wherein said change data is global presentation data.

12. The system as in claim 1 wherein said change data is comprised of global presentation data and individual apparatus program data for defining the logical sequencing.

13. The system as in claim 1 further characterized in that said master controller initializes the individual user apparatus memory with initial data,
and where thereafter the individual user apparatus logically sequences responsive to the initial data.

14. The system as in claim 13 further characterized in that said initial data is comprised of initial game rule and display data.

15. The system as in claim 1 further characterized in that each of said individual user apparatus memory is further characterized as comprising multiple frame buffer memories, for storing multiple video frames of audiovisual presentation of game play, and further characterized in that said change data is output from said master controller in an interleaved manner for local storage in the frame buffer memories of selected individual user apparatus.

16. The system as in claim 1 further comprising:
means for communicating individual user apparatus data from said individual user apparatus to said master controller,
further characterized in that said individual user apparatus data is comprised of data representing changes to the individual user apparatus input/output structure which affect game audiovisual presentation, score, and global game play.

17. The system as in claim 1 wherein each of said selected ones of said plurality of individual user apparatus simultaneously adapt to the change data from the master controller to provide a homogenous global game system.

18. The system as in claim 1 wherein said master controller is further comprised of:
means for processing said user signals from said selected ones of said individual user apparatus to provide corresponding identified data packets,
means for converting all individual user signals into global equivalent action data,
means for mapping said global equivalent action data into a global mapping space,
means for updating said global equivalent game action display data in said mapping space for selected ones of said local audiovisual presentations responsive to said data packets, and
means for outputting said change data responsive to said game action display data.

19. The system as in claim 1 wherein said master controller is further comprised of:
communications management means for transforming global presentation data to change data having a format compatible with the required by the selected ones of said plurality of individual user apparatus.

20. The system as in claim 1 wherein each of said selected ones of said individual user apparatus is further comprised of:
communications management means for transforming said individual user apparatus user signals to a format compatible with that required by the master controller.

21. The system as in claim 1 wherein said communications between said master controller and said selected ones of said plurality of individual user apparatus is comprised of totally digital data communications.

22. The system as in claim 1 wherein said communications is comprised of totally analog transmission.

23. The system as in claim 1 wherein said communications combines both analog and digital communications.

24. The system as in claim 1 further characterized in that each selected individual user apparatus is further comprised of means for creating an associated preselected character audiovisual presentation which is uniquely affiliated with said respective individual user apparatus, which preselected character audiovisual presentation is incorporated into a global game audiovisual presentation in combination with the preselected character functions of other selected ones of said plurality of individual user apparatus in combination with a predefined set of global audiovisual imagery segments and responsive to a predefined set of global game rules, wherein a global display audiovisual presentation is constructed.

25. A video game system comprising:
a plurality of user consoles, each of said consoles comprising:
a user control and means for providing user signals responsive to activation of said user control;
a memory for storing data and providing data output;
means for sequencing through one of a plurality of predefined audiovisual works responsive to said data output and said user control signals;
display apparatus comprising means for producing game audiovisual imagery representative of at least some of the user control signals responsive to said means for sequencing; and
central control means for interlinking selected user consoles and for loading data into the memory of selected user consoles.

26. The game system as in claim 25 wherein the display screen is further comprised of a plurality of separate display screens.

27. The system as in claim 26 further characterized in that each of said separate display screens displays a portion of the total global game display so that the viewing of the totality of the display units provides a total global display presentation.

28. The system as in claim 26 further characterized in that at least one of said separate display screens provides an audiovisual presentation of game action imagery, and further characterized in that at least one other of said separate display screens provides means for tracking the game play of other individual user apparatus.

29. The system as in claim 26 further characterized in that said plurality of separate display screens each has a separate and distinguishable viewing area, wherein the plurality of separate display screens provides means in combination for a coherent total display of global game play.

30. The system as in claim 25 further comprising:
production means for providing user requested audiovisual special effects imagery responsive to said user control signal.

31. The system as in claim 25 wherein said display apparatus comprises a plurality of physically separable subdisplays, each subdisplay having a separate and distinguishable viewing area, the plurality of subdisplays providing in combination a coherent total display.

32. The system as in claim 25 wherein said central control means is further comprised of:
means for generating global data responsive to a plurality of said user signals, and
means for mapping said global data to said memory of each of said selected user consoles in a format compatible with said selected user console's logical sequencing means.

33. The system as in claim 32 further characterized in that said global data is comprised of a plurality of individual user game data sets, each said data set corresponding to one of the selected plurality of user consoles, wherein said central control means is further comprised of means for selecting one of said individual game data sets as active,
further characterized in that said central control means is further comprised of means for constructing change data responsive to the selected active data set, which change data is coupled for loading into the memory of said selected user consoles.

34. The system as in claim 25 wherein each user console includes means for composing said user's local audiovisual presentation responsive to said memory, and wherein said central control means includes means for composing and transferring data to said selected user consoles' memories for providing for global and special functions on said local audiovisual presentation.

35. The system as in claim 25 wherein the data loaded by the central control means is global data representative of the totality of selected interlinked user consoles.

36. The system as in claim 35 wherein the interlinked selected user consoles communicate user signals to the central control means, and wherein said global data is output from said central control means responsive to said selected interlinked user console user signals.

37. The system as in claim 25 further characterized in that said central control means transfers game and initial presentation data to the memory of the selected ones of said plurality of user consoles, further characterized in that thereafter each of said selected ones of said plurality of user consoles thereafter operates independently with respect to the central control means, except for said user consoles' response to the interlinked, loaded data representing global change data.

38. The system as in claim 37 further characterized in that said selected ones of said plurality of user consoles transmit change data representative of local user signals, and further characterized in that said central control means transfers global change into the memory of the selected user consoles repetitively during active game play.

39. The system as in claim 25 wherein said central control means, and wherein each of said user consoles, are further comprised of means for supporting communications between said central control means and said user consoles,
wherein said communications support means is further comprised of means for translating the format of the interlinked data to achieve compatibility with the stored format of the data in each of the central control means and plurality of user consoles, and for compatibility with the communications medium utilized for interlinking said central control means and selected user consoles.

40. A distributed video game system comprising:
means for selectively interlinking a plurality of individual game apparatus each having associated user responsive inputs, memory for storing data, and a display for providing a local audiovisual presentation locally generated at each said game apparatus responsive to said data stored in the respective memory of said respective game apparatus;
means for coupling data among selected ones of said game apparatus; and
means for repetitively transferring data for storage in said memory of selected individual game apparatus coupled to said means for coupling.

41. The system as in claim 40 wherein each individual game apparatus is further comprised of multiple buffer memories for storing data representative of a sequence of multiple audiovisual presentations, wherein each selected one of said individual game apparatus generates an audiovisual presentation responsive to repetitive access to said respective multiple buffer memories of said respective individual game apparatus.

42. The system as in claim 40 further comprising:
means for communicating user signals among selected ones of said individual game apparatus.

43. The system as in claim 40 wherein each of said individual game apparatus is further comprised of communications management means for performing information data format translation, packing and unpacking of coupled data, and means for supporting communication of the coupled data amongst the selected ones of said individual game apparatus.

44. The system as in claim 40 further characterized in that all selected game apparatus simultaneously adapt to the data coupled among said select ones of said game apparatus to provide a homogenous global game system.

45. The system as in claim 40 further characterized in that all selected ones of said plurality of individual game apparatus bidirectionally communicate, and
wherein said data coupled among said selected ones of said game apparatus represents change data responsive to variations in the status of game play for a selected one of said individual game apparatus as compared to the others of said selected individual game apparatus, wherein said data coupled among the selected ones of said game apparatus is comprised of change data only.

46. The system as in claim 40 further characterized in that individual game apparatus can accommodate a plurality of users.

47. An interlinked distributed video game system, comprising a master controller and a plurality of individual user apparatus, wherein said master controller provides (1) communications management for coupling global change data to said plurality of individual user apparatus, (2) storage having means for linkage to an external storage device, and (3) global video display management means for providing global change data responsive to user signals, and wherein each of said individual user apparatus is further comprised of (1) user input means for providing said user signals responsive to a player stimulus, (2) user communications means for locally managing and transmitting said user signals and receiving said global change data for the respective individual user input apparatus between the master controller and respective user apparatus, and (3) local video display management for composing an audiovisual presentation responsive to, said user communications means.

* * * * *